(12) United States Patent
Su

(10) Patent No.: US 8,317,007 B2
(45) Date of Patent: Nov. 27, 2012

(54) CLUTCH DEVICE

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 461 days.

(21) Appl. No.: 12/722,549

(22) Filed: Mar. 12, 2010

(65) Prior Publication Data

US 2010/0294609 A1 Nov. 25, 2010

(30) Foreign Application Priority Data

May 19, 2009 (CN) .......................... 2009 1 0302446

(51) Int. Cl.
*F16D 31/00* (2006.01)
*F16D 43/20* (2006.01)
(52) U.S. Cl. .......................... 192/59; 192/56.3; 192/58.2
(58) Field of Classification Search ................. 192/56.3, 192/54.3, 58.1, 58.2, 59; 475/93, 94, 96, 475/112
See application file for complete search history.

(56) References Cited

U.S. PATENT DOCUMENTS

| | | | | |
|---|---|---|---|---|
| 1,231,160 A * | 6/1917 | Hungerford | ................. | 192/58.2 |
| 2,519,523 A * | 8/1950 | Wenz | ............................ | 192/58.2 |
| 2,747,432 A * | 5/1956 | Miller | ............................. | 475/94 |
| 3,262,336 A * | 7/1966 | Jackson | ......................... | 475/94 |
| 5,178,251 A * | 1/1993 | Losi, Jr. | ....................... | 192/54.3 |

* cited by examiner

*Primary Examiner* — Rodney Bonck
(74) *Attorney, Agent, or Firm* — Altis Law Group, Inc.

(57) ABSTRACT

A clutch device includes a sleeve-shaped first drive member, a first seal member, a second seal member, a plug, a second drive member, and a control member. The first drive member, the first seal member and second seal member cooperate to form a sealed chamber filled with hydraulic liquid. The plug divides the sealed chamber into a first chamber and a second chamber, and the plug defines a screw hole and an opening communicating the first chamber with the second chamber respectively. An output shaft is extended from the plug. The second drive member is driven by the first drive member, and includes a screw shaft threadedly engaged with the screw hole of the plug. The control member is configured for covering or uncovering the opening of the plug. The clutch device is used for prevent overload.

10 Claims, 5 Drawing Sheets

CLUTCH DEVICE

BACKGROUND

1. Technical Field

The present disclosure relates to a clutch device.

2. Description of Related Art

Some devices with precise drive and movement mechanisms, such as a motorized toy car, may be ruined because of overload. For example, if the toy is blocked during movement, the movement mechanism may be stopped, but the drive mechanism still outputs power, and thus become overloaded, which may ruin the drive and movement mechanisms.

Thus, what is needed is a clutch device that can prevent overloading of drive and movement mechanisms.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
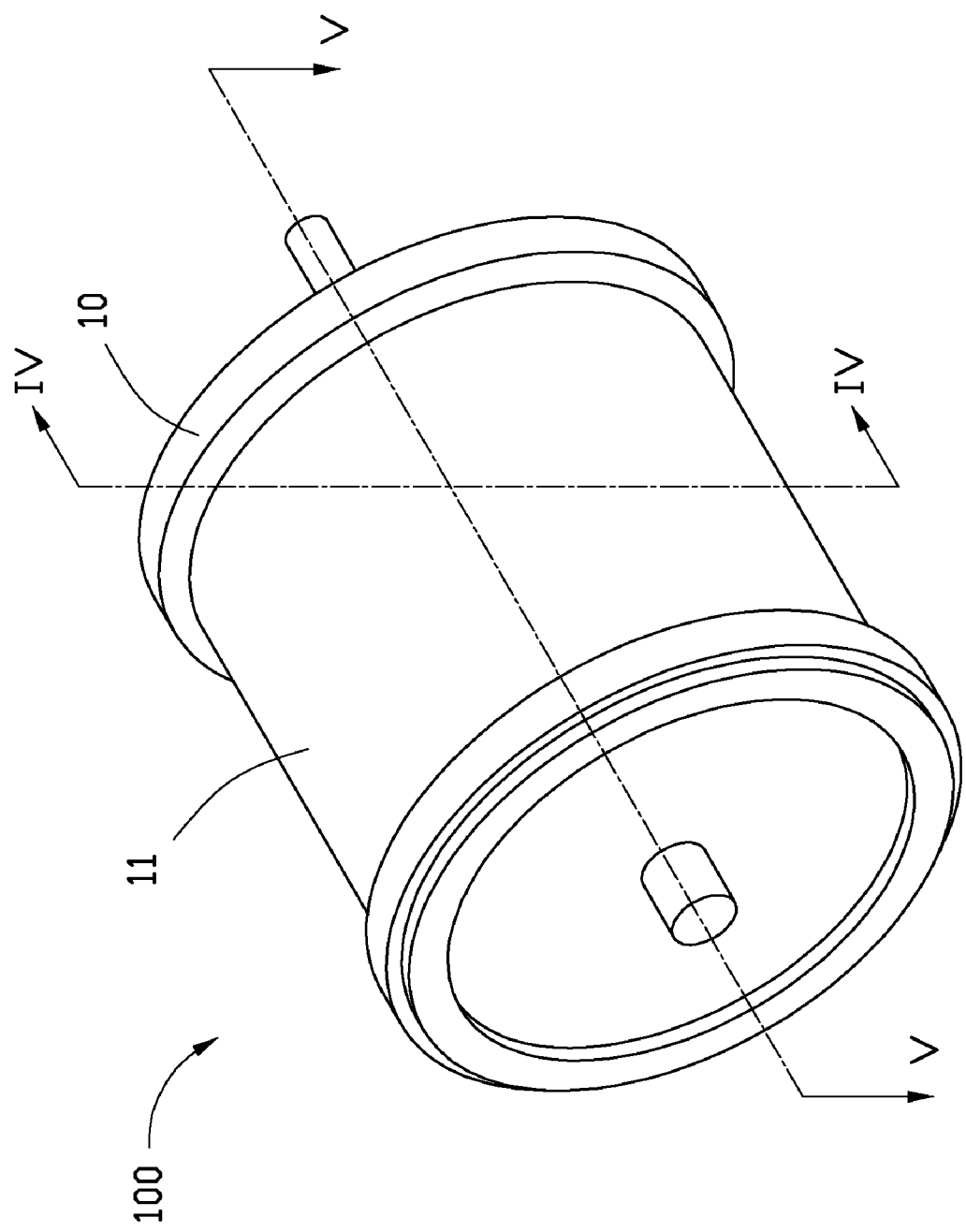
FIG. 1 is a schematic, isometric view of a clutch device according to an exemplary embodiment.
Figure 2:
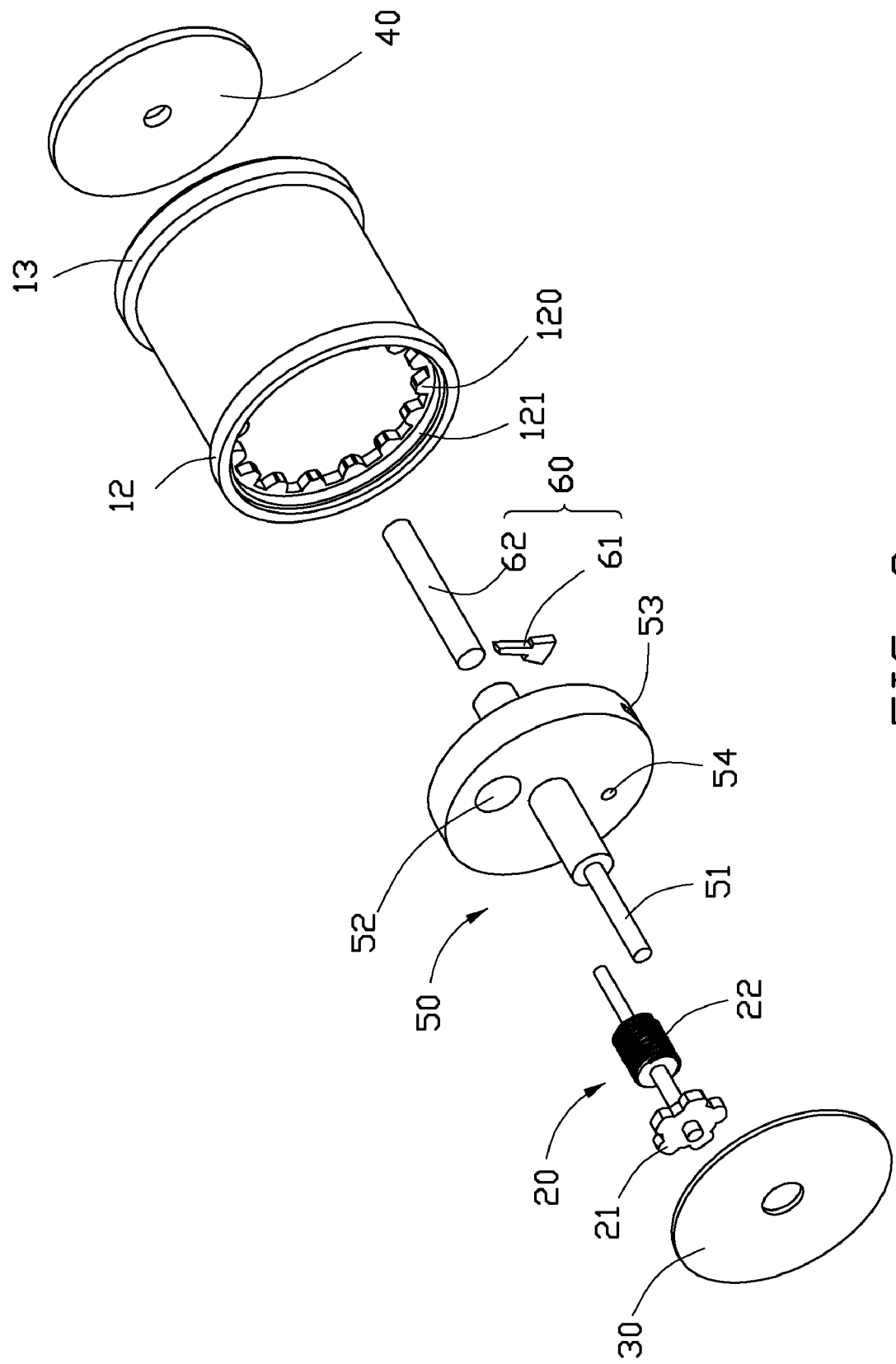
FIG. 2 is an exploded view of the clutch device of FIG. 1.

Referring to FIGS. 1 and 2, a clutch device 100 according to an exemplary embodiment is disclosed. The clutch device 100 includes a sleeve-shaped first drive member 10 and a second drive member 20 cooperated with the first drive member 10. The first drive member 10 defines a groove 11 in an outer circumferential surface thereof in which a motor driven drive belt (not shown) can be received.

Figure 3:
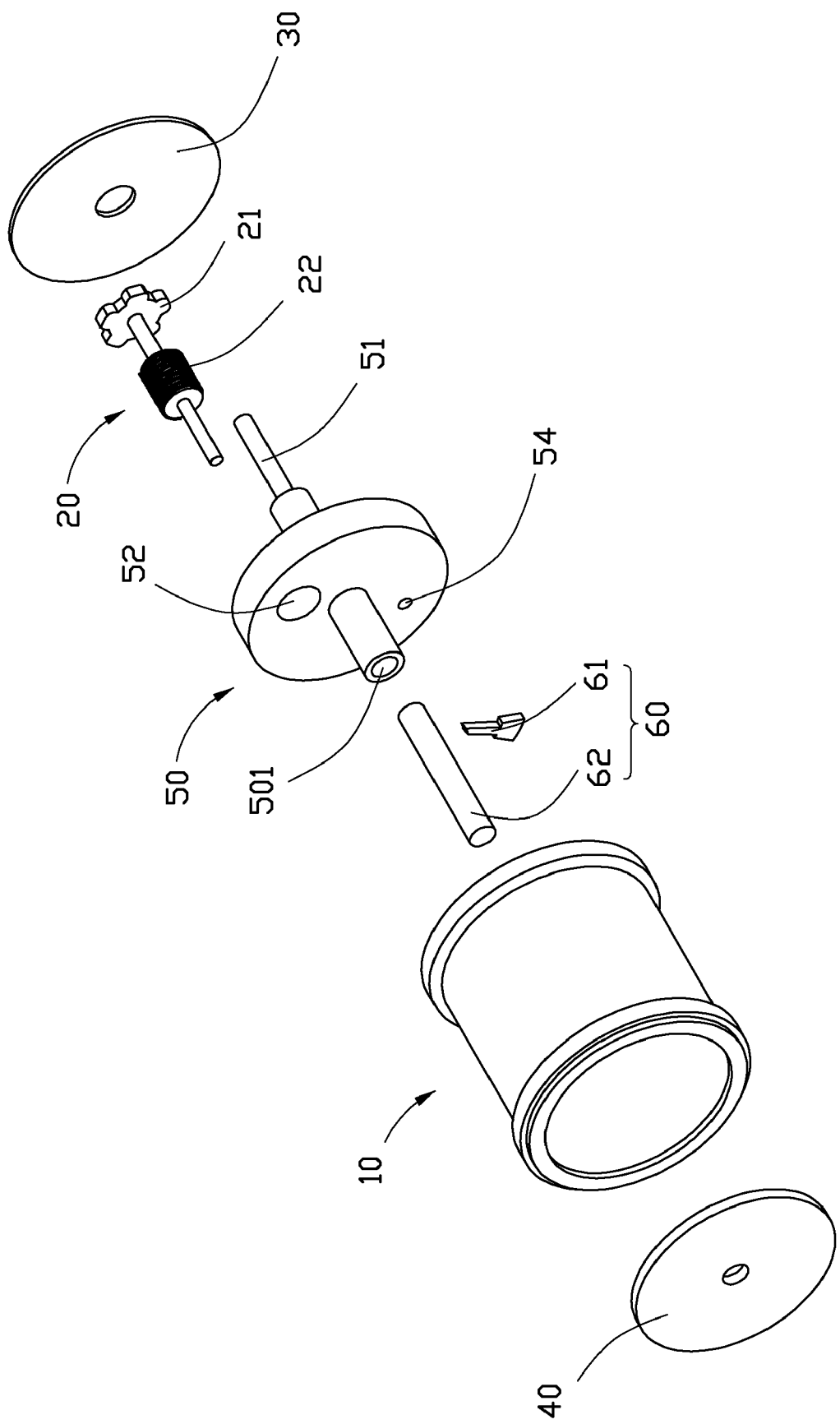
FIG. 3 is another exploded view similar to FIG. 2, but viewed from a different aspect.
Figure 4:
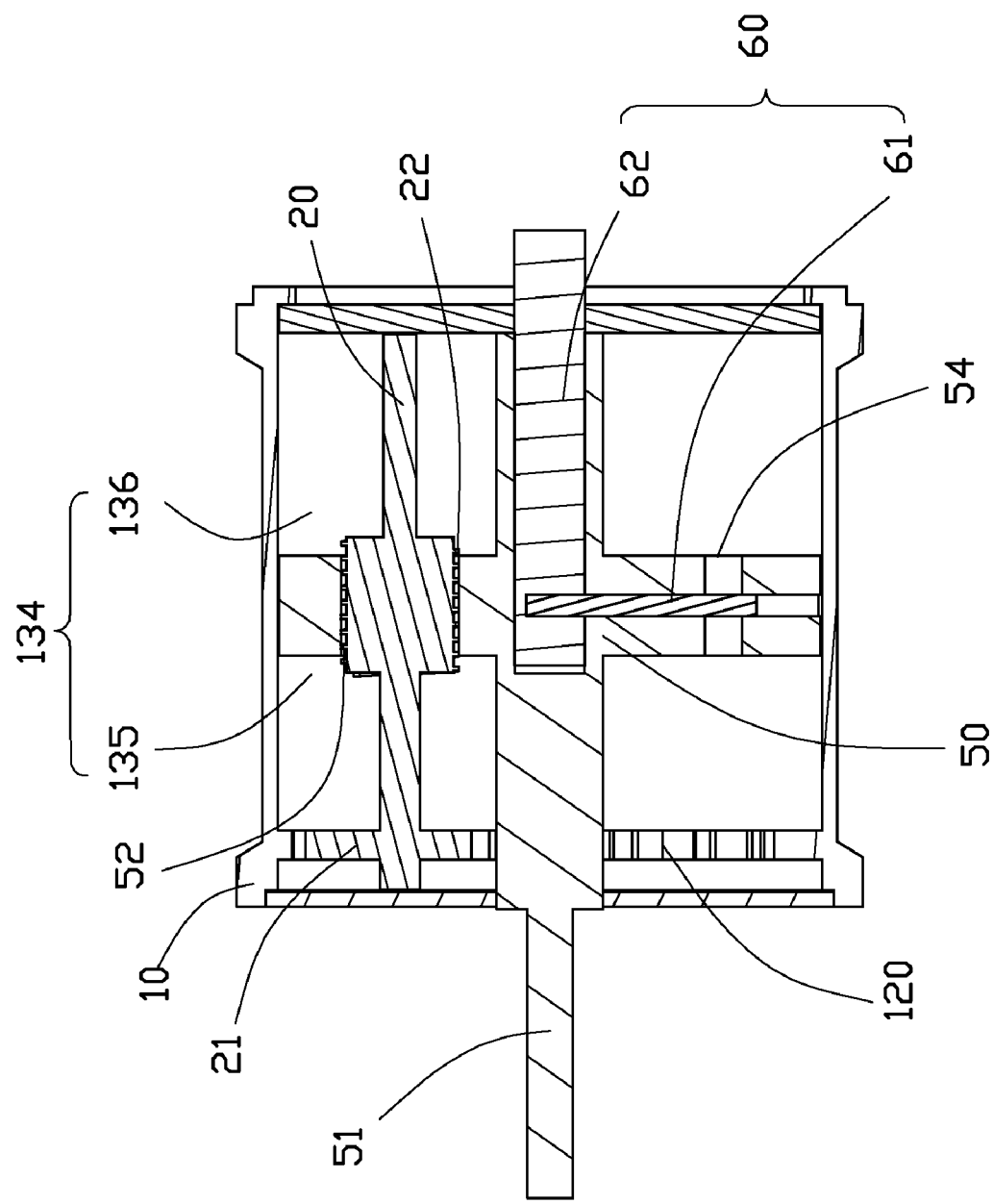
FIG. 4 is a cross-section view along line V-V of FIG. 1.

Referring to FIGS. 2, 3, and 4, the clutch device 100 further includes a first seal member 30, a second seal member 40, a plug 50, and a control member 60. The first seal member 30, the second seal member 40, and the first drive member 10 cooperate to form a sealed chamber 134. The sealed chamber 134 is filled with hydraulic liquid. The plug 50 divides the seal chamber 134 into a first chamber 135 and a second chamber 136.

The first drive member 10 includes a first end 12 and an opposite second end 13. The first end 12 includes an inner gear 120 and a groove 121. The first seal member 30 is fixed in the groove 121.

A stepped output shaft 51 extends from the plug 50. A thin end of the output shaft 51 extends out of the sealed chamber 134 through the first seal member 30. A thick end of the output shaft 51 is hollow and defines a receiving chamber 501 therein. The plug 50 defines an axial through hole 52 and an axial opening 54 communicating the first chamber 135 with the second chamber 136 respectively. The through hole 52 is a screw hole. The plug 50 further defines a radial groove 53 communicating with the receiving chamber 501 and the opening 54.

The second drive member 20 includes a screw shaft 22 and an outer gear 21 connected to each other. The screw shaft 22 is threadedly engaged with the hole 52 of the plug 50. The outer gear 21 engages with the inner gear 120 of the first drive member 10.

The control member 60 includes a drive shaft 62 and a block piece 61. The drive shaft 62 is rotatably mounted in the receiving chamber 501 of the output shaft 51. One end of the drive shaft 62 extends out of the sealed chamber 134 through the second seal member 40. The block piece 61 is located in the groove 53 and is fixed to the drive shaft 62. When the drive shaft 62 rotates, the block piece 61 rotates correspondingly. When the block piece 61 moves to the position where the opening 54 is located, the block piece 61 covers the opening 54; when the block piece 61-leaves the position where the opening 54 is located, the block piece 61 uncovers the opening 54.

Figure 5:
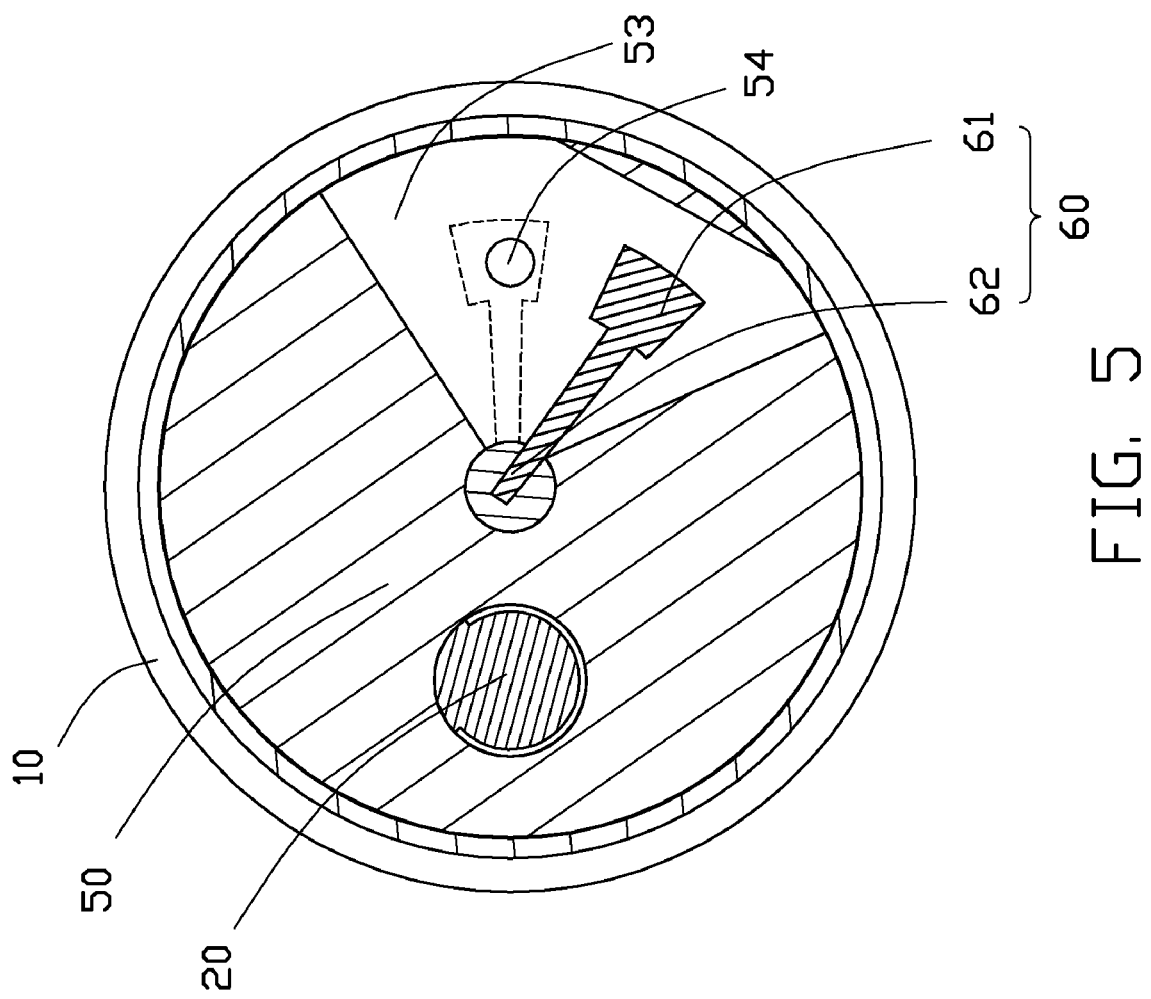
FIG. 5 is a cross-section view along line VI-VI of FIG. 1.

Referring to FIGS. 4 and 5, in use, the first drive member 10 is driven to rotate via the motor driven drive belt, the first drive member 10 drives the second drive member 20 to rotate via the inner gear 120 and the outer gear 21. The block piece 61 covers the opening 54, the first chamber 135 and the second chamber 136 are isolated from each other, the hydraulic liquid cannot flow between the first chamber 135 and the second chamber 136, the plug 50 cannot slide along the screw shaft 22, the screw shaft 22 of the second drive member 20 drives the plug 50 to rotate. The output shaft 51 of the plug 50 rotates and outputs power normally.

When overloaded is happened, the drive shaft 62 is driven to rotate by hand or by a feedback mechanism, the block piece 61 uncovers the opening 54. The first chamber 135 and the second chamber 136 communicated to each other. The hydraulic liquid can flow between the first chamber 135 and the second chamber 136 through the opening 54 and the hole 52. The plug 50 slides along the screw shaft 22 and the second drive member 20 cannot drive the plug 50 to rotate. The output shaft 51 does not output power anymore.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A clutch device comprising:
   a sleeve-shaped first drive member;
   a first seal member and a second seal member cooperating with the first drive member to form a sealed chamber, wherein the sealed chamber is configured for being filled with hydraulic liquid;
   a plug positioned in the sealed chamber, dividing the sealed chamber into a first chamber and a second chamber, wherein the plug defines a screw hole and an opening communicating the first chamber with the second chamber respectively;
   an output shaft extended from the plug;
   a second drive member to be driven by the first drive member, wherein the second drive member comprises a screw shaft threadedly engaged with the screw hole of the plug; and
   a control member for covering or uncovering the opening of the plug.

2. The clutch device of claim 1, wherein one end of the output shaft extends out of the sealed chamber through the first seal member, the other end of the output shaft defines a receiving chamber.

3. The clutch device of claim 2, wherein the plug further defines a groove communicating with the receiving chamber and the opening.

4. The clutch device of claim 3, wherein the control member comprises a drive shaft rotatably mounted in the receiving chamber, and a block piece located in the groove and fixed to the drive shaft.

5. The clutch device of claim 4, wherein one end of the drive shaft extends out of the sealed chamber through the second seal member.

6. The clutch device of claim 1, wherein the first drive member comprises an inner gear wheel, and the second drive member comprises an outer gear engaged with the inner gear.

7. The clutch device of claim 1, wherein the output shaft is a stepped shaft and comprises a thin end and a thick end connected to the thin end, the thin end of the output shaft extends out of the sealed chamber through the first seal member, the thick end of the output shaft defines a receiving chamber.

8. The clutch device of claim 7, wherein the plug further defines a groove communicating with the receiving chamber and the opening.

9. The clutch device of claim 8, wherein the control member comprises a drive shaft rotatably mounted in the receiving chamber, and a block piece located in the groove and fixed to the drive shaft.

10. The clutch device of claim 9, wherein one end of the drive shaft extends out of the sealed chamber through the second seal member.

* * * * *